US009058577B2

(12) United States Patent
Polsky

(10) Patent No.: US 9,058,577 B2
(45) Date of Patent: Jun. 16, 2015

(54) NETWORK CENTRIC STRUCTURED COMMUNICATIONS NETWORK

(75) Inventor: Stan Polsky, Pittsburgh, PA (US)

(73) Assignee: Epmod, Inc., Pittsburgh, PA (US)

( * ) Notice: Subject to any disclaimer, the term of this patent is extended or adjusted under 35 U.S.C. 154(b) by 923 days.

(21) Appl. No.: 13/205,008

(22) Filed: Aug. 8, 2011

(65) Prior Publication Data

US 2012/0036255 A1 Feb. 9, 2012

Related U.S. Application Data

(60) Provisional application No. 61/371,879, filed on Aug. 9, 2010.

(51) Int. Cl.
*G06F 15/16* (2006.01)
*G06F 15/173* (2006.01)
*G06F 11/00* (2006.01)
*G06Q 10/06* (2012.01)
*G06Q 10/10* (2012.01)

(52) U.S. Cl.
CPC .......... *G06Q 10/0631* (2013.01); *G06Q 10/103* (2013.01)

(58) Field of Classification Search
None
See application file for complete search history.

(56) References Cited

U.S. PATENT DOCUMENTS

| 2003/0225888 | A1* | 12/2003 | Wason | 709/227 |
| 2005/0152286 | A1* | 7/2005 | Betts et al. | 370/255 |
| 2005/0251661 | A1* | 11/2005 | Uguen et al. | 712/226 |
| 2006/0136990 | A1* | 6/2006 | Hinton et al. | 726/2 |
| 2010/0185630 | A1* | 7/2010 | Cheng et al. | 707/756 |
| 2011/0047182 | A1* | 2/2011 | Shepherd et al. | 707/780 |

OTHER PUBLICATIONS

Facebook, Wikipedia, http://web.archive.org/web/20100116041936/http://en.wikipedia.org/wiki/Facebook, (Jan. 16, 2010).
Twitter, Wikipedia, http://web.archive.org/web/20100109031953/http://en.wikipedia.org/wiki/Twitter, (Jan. 9, 2010).
Google Wave, Wikipedia, http://web.archive.org/web/20100123042417/http://en.wikipedia.org/wiki/Google_Wave, (Jan. 23, 2010).

(Continued)

*Primary Examiner* — Ninos Donabed
*Assistant Examiner* — Farrukh Hussain
(74) *Attorney, Agent, or Firm* — The Webb Law Firm

(57) ABSTRACT

The present invention is a network centric management and communications system and method enabling users with commitments to communicate, manage, notify, assign, link, and/or collaborate with other users. The system includes a database storing one or more user accounts corresponding to nodes on a network, user accounts connected by interdependencies forming social connections between individual users having responsibilities and structuring communications via dependency links between interdependent users. The system includes a data server, receiving responsibility data comprising requirements data for creating interdependencies, transmitting assigned commitments, and updating responsibility data. The system further includes a communications link to provide status updates and/or notifications of responsibilities to affected users regarding their status that appropriate corrective action may be taken before one or more commitments to requirements are broken, wherein one or more commitments of a responsibility are modified and/or updated. The system can host multiple projects simultaneously in the data server.

17 Claims, 7 Drawing Sheets

(56) References Cited

OTHER PUBLICATIONS

Active Session of Google Wave Inside Google Chrome, Wikipedia, http://en.wikipedia.org/wiki/File:Google_Wave. png, (last updated Jun. 28, 2010).

Project Portfolio Management, Wikipedia, http://web.archive.org/web/20090313070107/http://en.wikipedia.org/wiki/ Project_portfolio_management, (Mar. 23, 2009).

Project Investment Portfolio Occam's Tree, Wikipedia, http://web.archive.org/web/20070927231151/http://upload.wikimedia.org/wikipedia/en/b/b2/Project_Investment_Portfolio_Occam_s_Tree.gif (last updated May 25, 2007).

Integrating Visio 2007 and Project 2007, Microsoft Developer Network, http://msdn.microsoft.com/en-us/library/aa827350(v=office.12).aspx, (last modified Nov. 25, 2008).

* cited by examiner

Task Manager #1 Dashboard

● Add　　▣ Project Chart　　▣ Project Report　　▣ Task Chart　　▣ Task Report

| Task Name | Project Name | Role | Task Manager | Scheduled End | Promised End ▲ | $ | ⏲ | ★ | ⚠ | ⬢ |
|---|---|---|---|---|---|---|---|---|---|---|
| Initial Turbine Investigation | Design and Construct Two-Stage TurbineEngine | Task Manager | Self | 03/27/2009 | | | Ⓖ | ★ | ⚠ | ⬢ |
| Develp Turbine Design Specifications | Design and Construct Two-Stage Turbine Engine | Task Manager | Self | 05/01/2009 | | Ⓖ | Ⓡ | Ⓖ | Ⓖ | Ⓖ |
| Assemble Turbine | Design and Construct Two-Stage TurbineEngine | Task Manager | Self | 12/11/2009 | | Ⓖ | Ⓡ | Ⓖ | Ⓖ | Ⓖ |
| Deliver Turbine | Design and Construct Two-Stage TurbineEngine | Task Manager | Self | 12/18/2009 | | Ⓖ | Ⓡ | Ⓖ | Ⓖ | Ⓖ |
| Build Two-Stage Turbine Components | Design and Construct Two-Stage TurbineEngine | Task Manager | Self | 09/11/2009 | 09/18/2009 | Ⓖ | Ⓡ | Ⓖ | Ⓖ | Ⓖ |

🔍 | ▼ | ◀ | Page 1 of 1 | ▶ | ▶| | Displaying 1 to 5 of 5 Items $ Budget　⏲ Timeline　★ Resources　⚠ Issues　⬢ Risks
　　500　　502　　504　　506　　508

FIG. 5a

NETWORK CENTRIC STRUCTURED COMMUNICATIONS NETWORK

CROSS-REFERENCE TO RELATED APPLICATION

This application claims the benefit of the following provisional application, which is hereby incorporated by reference in its entirety:

U.S. Provisional Patent Application No. 61/371,879 filed Aug. 9, 2010, titled "Network Centric Structured Communication Network."

BACKGROUND OF THE INVENTION

Many businesses and governmental agencies experience huge time and cost overruns from managing the operations of large and complex undertakings, especially those involving disparate organizations, partners, teams, and multiple levels of suppliers. Company executives, project leaders, and individuals with interrelated commitments at all levels of operational responsibility lack the specific information they need to make timely and effective decisions in order to enable each organization involved to accomplish both its commitments to the enterprise mission objective and to remain in sync with strategic business objectives.

Traditional centralized management paradigms with assistance from existing tools ultimately place company executives, project leaders, or any individual with commitments at all levels of the corporate hierarchy in the position of being a critical path for information; information that they often do not have. Although traditional management paradigms may be effective when most individuals of a business are located in the same geographical location, as inevitable changes occur throughout the implementation of a project, the executives and project leaders often spend an inordinate amount of time just keeping up with all the changes instead of managing the more important issues. This is especially true when businesses and partnerships span multiple geographical locations around the world.

As a result, there remains a need for an improved system and method for individuals with interrelated responsibilities to understand, manage, and meet their commitments and to be able to alert others when they need to re-commit.

SUMMARY OF THE INVENTION

The present invention relates to a method of forming connected responsibilities and linking dependencies in a shared enterprise. The method includes receiving responsibility data comprising requirements data from a first node and assigning the responsibility data to a second node. The method further includes receiving a first sub-responsibility data having a first sub-requirements data from a second node based at least partially on the responsibility data assigned from the first node. Next, the system assigns the first sub-responsibility data having the first sub-requirements data of the second node to a third node. A transmission of at least one commitment for the first sub-requirements data of the first sub-responsibility data is sent to the second node. A further transmission of the first sub-responsibility data is sent to the first node. A connection is formed by receiving link data for horizontal input interdependencies and horizontal output interdependencies for the first sub-responsibility data of the second node. The requirements data can be updated based on receiving updated requirements data of the responsibility data for the second node or any other node and receiving at least one commitment to the updated requirements data of the responsibility data for the second node. The commitment of the requirements data of the responsibility data for the second node is sent to the first node, where, as connections are formed based on responsibilities and responsibilities updated and/or completed, a dynamic network among nodes is formed.

Another object of the present invention is forming connected responsibilities and linking dependencies in a shared enterprise. A first sub-responsibility data having the first sub-requirements data of the second node is sent to a third node. The third node can receive a second sub-responsibility data having a second sub-requirements data from the third node based on the first sub-responsibility data assigned from the second node and receive link data for horizontal input dependencies and horizontal output dependencies for the second sub-responsibility data of the third node. Received requirements data is based on the responsibility data for the third node. The system receives commitments for the first sub-requirements data of the first sub-responsibility data from the third node and transmits the commitment of the third node to the second node.

Another object of the present invention is to form connected responsibilities and link dependencies in a shared enterprise. The method includes receiving a commitment update for a second node and identify interdependencies of the first sub-responsibility data of the second node in response to the commitment update and transmit, in response to the commitment update, at least one notification to at least one other node that is dependent upon first sub-responsibilities data of the second node. Further, connected responsibilities are formed and dependencies linked in a shared enterprise. The requirements data includes scope of the responsibility, required resources of the responsibility, scheduled start date, scheduled end date, responsibility values, and/or responsibility objective. The responsibility data can include responsibility name, responsibility description, and/or the responsible individual node. The sub-responsibility data includes a task and/or a sub-task. A commitment can be at least one of a promised start date and promised end date for each responsibility. A notification can be an e-mail, a status update, a scheduled meeting request, or a real time meeting request. The status update can be defined, for example, but not limited to, as active, complete, delayed, inactive, pending, planning, or start up. The status update can cause the status indicator to fall below a predetermined threshold.

Another object of the present invention is a network centric management and communications system enabling users with commitments to communicate, manage, notify, assign, link, and/or collaborate with other users. The system includes a database storing one or more user accounts corresponding to nodes on a network, the user accounts connected by interdependencies forming social connections between individual users having responsibilities and structuring communications via dependency links between interdependent users. The system includes a data server, receiving responsibility data comprising requirements data for creating the interdependencies, transmitting assigned commitments, and updating responsibility data. The system further includes a communications link to provide status updates and/or notifications of responsibilities to affected users regarding their status so that appropriate corrective action may be taken before one or more commitments to requirements are broken, wherein one or more commitments of a responsibility are modified and/or updated. The system can host multiple projects simultaneously in the data server. The data system can be a web or application server. The data server removes a completed responsibility and severs the social connection between the interdependent users. A dynamic social network is formed among the interdependent users as responsibility data and commitments as interdependencies are created and removed. The data server can provide automatic messages between users to communicate, manage, notify, assign, link, and/or collaborate with other individuals. Users of the system include a responsibility assignment user, support services user, personnel manager user, and/or executive oversight user. The data server can provide a responsibility assignment user interface including a responsibility assignment user environment; a support services user interface including a support services environment; a personnel manager user including an interface personnel manager environment; and/or an executive oversight user interface including an executive oversight environment. The data server further provides the various environments or user interfaces to users or individuals across a variety of communication networks.

A computer readable medium is provided, having a program recorded thereon for performing connected responsibilities and linking dependencies in a shared enterprise. The computer readable medium includes receiving responsibility data comprising requirements data from a first node and assigning the responsibility data to a second node. The method further includes receiving a first sub-responsibility data having a first sub-requirements data from a second node based at least partially on the responsibility data assigned from the first node. Next, the system assigns the first sub-responsibility data having the first sub-requirements data of the second node to a third node. A transmission of at least one commitment for the first sub-requirements data of the first sub-responsibility data is sent to the second node. A further transmission of the first sub-responsibility data is sent to the first node. A connection is formed by receiving link data for horizontal input interdependencies and horizontal output interdependencies for the first sub-responsibility data of the second node. The requirements data can be updated based on receiving updated requirements data of the responsibility data for the second node or any other node and receiving at least one commitment to the updated requirements data of the responsibility data for the second node. The commitment of the requirements data of the responsibility data for the second node is sent to the first node, where, as connections are formed based on responsibilities and responsibilities updated and/or completed, a dynamic network among nodes is formed.

BRIEF DESCRIPTION OF THE DRAWINGS

FIGS. 5a-5b illustrate embodiments of the NCMC System user interface; and

DETAILED DESCRIPTION OF THE INVENTION

Figure 1:
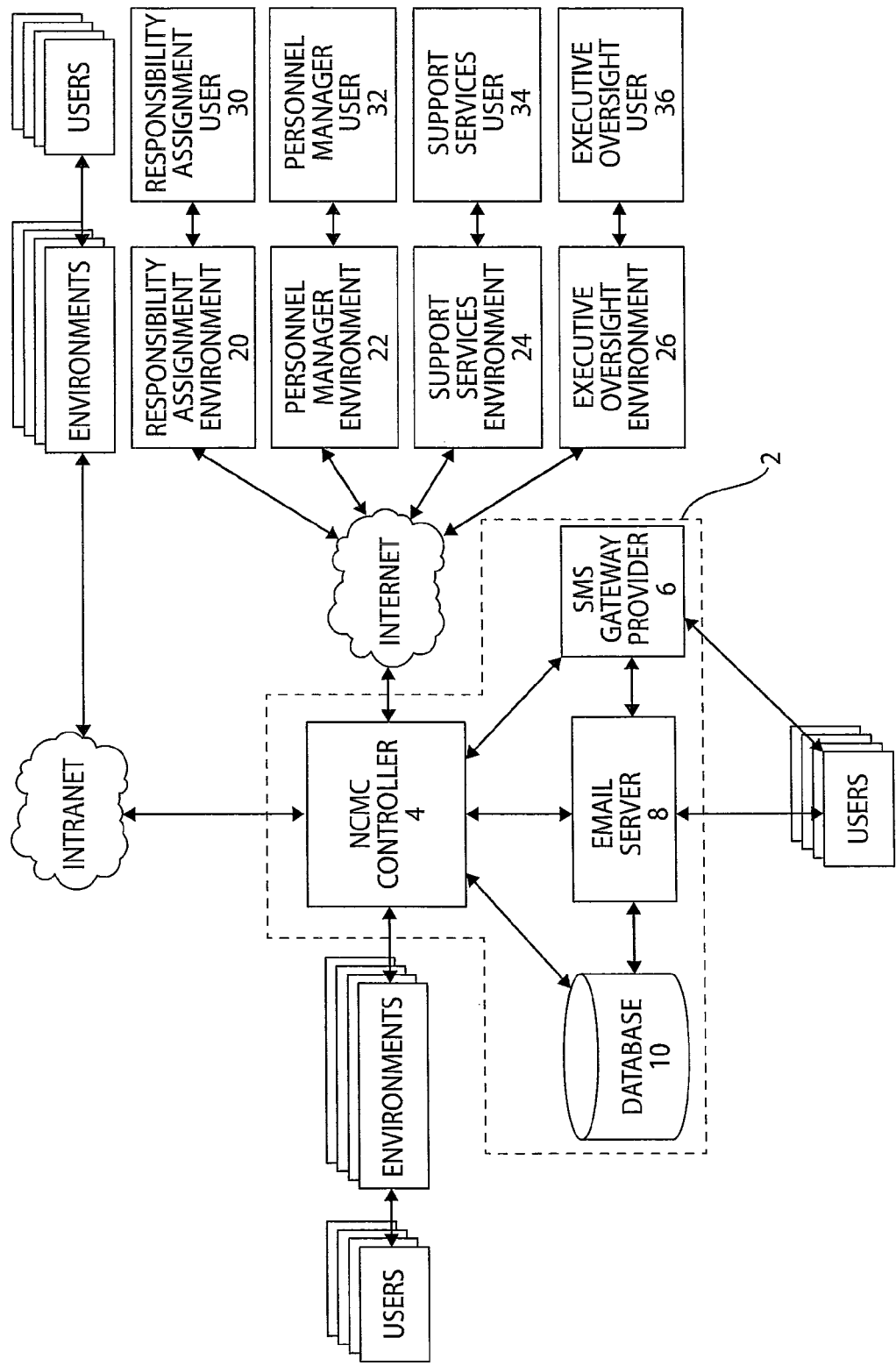
FIG. 1 illustrates an embodiment of a Network Centric Management and Communications (NCMC) System.

An object of the present invention is to provide business, industry, and government operations with an Internet-based self-forming network-centric structured communication network paradigm. The present invention provides a structured enterprise communication network and early alert warning system that links executives, team leaders, and individuals with interrelated commitments to each other and their shared task commitment plans. The present invention also provides the means for communication to all that may be affected by potential upcoming delays to enable timely and appropriate corrective action. Those sharing a common task deliverable will be informed if their counterparts have re-committed, or have fulfilled their commitments. The present invention will facilitate the assignment of a person to a node in the network and will enable that individual to link to the deliverable and person responsible for providing the timely information needed to successfully meet his/her commitment. Assignments of individuals to a node and this self-forming networking capability will facilitate effective communication of all who are in the network.

Another object of the present invention is to provide, at all levels of responsibility, real time updates via personalized dashboards with visibility of status, progress, and potential delays of any dependent or interrelated tasks. Properly structured project and enterprise information is passed up, down, and across the organizational and enterprise hierarchy to targeted individuals, and is traceable downward to the source of information.

The present invention uses a bottom up approach during implementation, linking individuals responsible for achieving specific results with varying levels of the undertaking and organizational hierarchy. Another object of the present invention is to connect key colleagues to one another on a communication network, allowing upper management and administrators alike to align project objectives with business needs. Upper management can track the functions necessary to maintain the extended enterprise and meet organizational goals. Project managers, team leaders, and unit heads can effectively manage daily operations. Individual team members can create links to others to stay informed on the progress of interrelated tasks.

Another object of the present invention is to provide a self-forming structured communication network and a network centric approach to management. This approach employs a distributed management methodology that empowers individuals to take responsibility for managing their own workload and to network directly and in real time with others working on interrelated tasks, so they can solve problems at their level of responsibility. Thus reducing time delays by taking corrective actions much sooner than is possible with the conventional "centralized" management approach. This self-forming network is the means by which each individual contributes to the collective work of undertakings, irrespective of the size of the undertaking on which he or she has made a commitment to accomplish an assigned objective.

Under this approach, individuals communicate across organizational and geographical boundaries to collaborate and achieve shared goals. A team leader at each level starts assigning specific responsibilities for producing the deliverable to one or more individuals by providing a description of the deliverable, its strategic value to the organization, the project's business objective, and scheduled start and end date. Completion of the assignment becomes the responsibility of the assignee once he/she accepts the responsibility and commits to the schedule; the responsibility includes planning how the expected results will be achieved and providing a commitment to complete each deliverable by a specific promised start and end date. These assignees are task or team leaders, who can either complete deliverables themselves or can, in turn, delegate pieces of their assigned deliverable to others. At any level of this network centric approach, deliverables can be assigned to members of an external organization. The Internet-based software facilitates the linking of individuals working in disparate organizations to enable communication with each other and teamwork, regardless of geographical or organizational barriers.

To support the above approach, a further object of the present invention is to provide real time dashboards enabling individuals to manage their commitments. The dashboards can be used for managing an individual's responsibilities, for example, tasks, projects, programs, portfolios; and with its multi-tier self forming networks, will also address business and manufacturing processes, and supply chains. Each deliverable and the person responsible for its completion can be linked to other deliverables and those responsible for interrelated tasks related to the common outcome objective, whatever the undertaking. Dashboard viewers can view and manage commitments. A task dashboard shows the commitments for each user, the scheduled and promised date that has been committed for each, and the status of any dependent or interrelated tasks. A user can reschedule or recommit deliverables in danger of being missed, which, in turn, automatically informs interrelated users (possibly from other organizations) that are waiting for the particular deliverable, providing all affected with valuable decision-making information that allows immediate action to be taken to realign their workload if discrepancies develop.

The self-forming structured communication network methodology of the present invention places responsibilities at the individual level. Each individual can form a negotiated commitment to complete their individual task or deliverable, instead of performing to dates planned and dictated by others. Under this model, individual users participate and plan a promised start and end date by which they can successfully complete the assignment and can negotiate with the assigner so that the project goals, organizational business objectives, and delivery dates are all in alignment. Even after an initial commitment date has been established, it can be adjusted if there is a risk that it may not be met. The changed promise date of any subtask or deliverable is provided to users at each level with a need to know. Users can then determine if interdependent tasks may still be met or, alternatively, are at risk. Users can update their information regarding potential impacts of a given change in real time, sharing decision-making information with the team members and others with higher level responsibility. Managers and executives can use the software to gain valuable insight into the operation of the organization.

Numerous specific details are set forth to provide a thorough understanding of the embodiments. It will be understood by those skilled in the art, however, that the embodiments may be practiced without these specific details. In other instances, well-known operations, components, and/or circuits have not been described in detail so as not to obscure the embodiments. It can be appreciated that the specific structural and functional details disclosed herein may be representative and do not necessarily limit the scope of the embodiments.

References throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

In various embodiments, each user may also have an account in the NCMC System 2. The account may be used to identify the particular user in the NCMC System 2. In one embodiment, upon first use of the NCMC System 2, the NCMC System 2 may prompt the user to create an account including login information. In response, the NCMC System 2, may build and/or create an account associated with the particular user and store and/or archive the account in one or more databases. Furthermore, each user's account may be associated with or include persistent data unique to each user in the NCMC System 2 and the persistent data may be updated and/or modified by the NCMC System 2 as the users modify the various aspects of their account. The persistent data may include, but is not limited to indicator data, company data, group data, user data, user permissions data, associated project data, associated task data, associated standard process data, and associated step data, and/or login data. The login data may include, but is not limited to, a user name and password, a user name and a hashed/encrypted password, a one time key, a single unique identifier, and/or any other information that may be used to identify and authenticate the user in the NCMC System 2.

Additionally, the NCMC System 2 may save, store, and/or archive, at least one responsibility where each responsibility may include, but is not limited to, one or more projects having associated project data, one or more tasks having associated task data, and one or more steps having associated step data. The project data may include project name, project type, project status, the project priority, the responsible individual's name, the scheduled dates, the promised dates, the actual dates, status indicator data, dependency data which may include, but is not limited to, one or more input dependencies, one or more output dependencies, and/or one or more vertical dependencies. The task data may include, but is not limited to, task name, task description, the responsible individual's name, the scheduled dates, the promise dates, the actual dates, one or more input dependencies, one or more output dependencies, and/or one or more vertical dependencies.

The standard process data may include but is not limited to, standard process name, standard process type, standard process status, the standard process priority, the responsible individual's name, the scheduled dates, the promised dates, the actual dates, status indicator data, dependency data which may include, but is not limited to, one or more input dependencies, one or more output dependencies, and/or one or more vertical dependencies. The step data may include step name, step description, the responsible individual's name, the scheduled dates, the promise dates, the actual dates, one or more input dependencies, one or more output dependencies, and/or one or more vertical dependencies.

FIG. 1 illustrates an embodiment of a Network Centric Management and Communications (NCMC) System 2 having various components for enabling individuals with commitments to communicate, manage, notify, assign, link, and collaborate with other individuals to complete one or more projects. Although FIG. 1 may show a limited number of components, it can be appreciated by a person skilled in the art that greater or fewer numbers of components may be employed for a given implementation. In a non-limiting exemplary embodiment, the Database may store data/information for the system within each of the databases into one or more tables within the single database or any other logical and/or physical boundaries known to those skilled in the art for storing and/or separating data/information in a database.

In another non-limiting exemplary embodiment, the NCMC System 2 may provide, simultaneously and in any combination, one or more Responsibility Assignment Environment 20 or Responsibility Assignment User Interfaces, one or more Support Services Environment 24 or Support Services User 34 Interfaces, one or more Personnel Manager Environment 22 or Personnel Manager User Interfaces, one or more Executive Oversight Environment 26 or Executive Oversight User 36 Interfaces. In another non-limiting exemplary embodiment, the NCMC System 2 may provide the various environments or user interfaces to users or individuals across a variety of communication networks which may include, but is not limited to, intranet, Internet, or alternatively, directly coupled to the environments. In another non-limiting exemplary embodiment, the NCMC Controller 4 may be implemented on a computer, such as Computer 1300 illustrated in FIG. 6 having memory that includes executable software modules where the executable software modules comprises computer executable instructions configured to perform the embodiments described herein. Furthermore, the NCMC Controller 4 may provide the environments or the user interfaces, in any combination, via the Network Environment 1338 to one or more computers, for example, Computer 1344 for display to one or more individuals.

In various embodiments, the NCMC System 2 may provide the environments or user interfaces in a web browser (not shown) such as Opera, Internet Explorer, Firefox, Chrome, and/or any other suitable web browser in accordance with the described embodiments. In various embodiments, the web browser may be implemented by a computer and/or by a mobile device, and may support computer programming languages, standards, web protocols and/or technologies required by the NCMC System 2 to communicate with the users via their respective environments. Such computer programming language standards, web protocols, and/or technologies may include, but are not limited to, HTML, XHML, XML, ActionScript, JavaScript, ECMAScript, Jscript, Basic, Visual Basic, VBScript, CSS, Asynchronous JavaScript, and XML (Ajax), Java, Python, Perl, C#/.net and/or any other suitable programming, scripting, or VM-based languages. To support the various programming language standards, web protocols and/or technologies, the web browser may include a language interpreter such as a script and/or runtime interpreter for computer programming languages such as JavaScript®, ActionScript®, VBScript®, C#, Jscript, or any other scripted and/or interpreted programming languages that are interpreted in real time by the script, and/or runtime interpreter which may be implemented within the web browser or by a plug-in. The runtime interpreters may include, but are not limited to, Flash® or Silverlight® or any other software module that executes source code, executes intermediate code translated from source code, or executes precompiled source code. Accordingly, in various embodiments, the NCMC Controller 4 may be coupled to one or more computers and/or mobile devices across a variety of computer and/or communication networks, for example, the Internet and/or Intranet to provide to users the environments in various web browsers implemented on the one or more computers and/or mobile devices.

In various embodiments, the NCMC Controller 4 may also be coupled to one or more databases across a variety of computer networks, for example, the Internet and/or Intranet to store user accounts and associated persistent data in the one or more databases. The NCMC Controller 4 may also be coupled to one or more E-Mail Servers 8 and one or more SMS Gateway Providers 6 to provide e-mail and text message notifications to users or individuals. Additionally, the NCMC Controller 4, may transmit, communicate, send, and/or output persistent data, project data, and/or task data, generated, calculated, stored, and/or computed by the NCMC Controller 4 to one or more user environments on one or more computers or mobile devices. The NCMC Controller 4, may also receive, communicate, and/or store persistent data, project data, and/or task data that is inputted, entered, created, generated, and/or populated in one or more user environments on one or more computers or mobile devices. It may also be appreciated by a person skilled in the art that the controller may also be implemented, at least partially, in a high level and/or low level programming language coupled to at least one Application Program Interface (API) for one or more software modules and/or operating systems. The high level or low level programming language may be compiled to machine code native to the hardware and/or operating system and linked to various software modules and/or software libraries. The compiled and linked machine code may also be stored in a computer readable storage medium coupled to at least one processor and executed by at least one processor. Furthermore, it may be appreciated that the machine code or executable program instructions may be coupled to one or more aforementioned language interpreters via various remote procedural call mechanisms and/or binary interfaces, for example, .Net Remoting and/or Component Object Model (COM).

In various embodiments of the NCMC System 2, as persistent data, project data, task data, standard process data, and/or step data are updated, added, removed, and/or modified as described herein after, the NCMC System 2 may send notifications, in real time, to the affected users or individuals in the Responsibility Assignment Environment 20, users or individuals in the Support Services Environment 24, personnel manager users in the Personnel Manager Environment 22, and/or executive oversight users or individuals in the Executive Oversight Environment 26. Each notification may contain one or more time stamps, e.g., the date and time of when the message was sent, the sender's name, the type of message, the priority of the message, the project the message relates to, the subject of the message and/or the substantive content of the message. In a non-limiting exemplary embodiment, the notification may occur in the form of a message within the comments section associated with a responsibility or a status indicator of the responsibility, or within a communications section of the particular user's environment. Additionally, notifications may also be sent external to the user environments. In another non-limiting exemplary embodiment, messages may also be sent via e-mail using an e-mail server coupled to the NCMC Controller 4 and/or a text message via one or more Short Messaging Service (SMS) gateway providers across one or more Public Switched Telephone Networks (PSTN) and/or Public Land Mobile Networks (PLMN).

Although FIG. 1 illustrates a stand alone embodiment of the present invention, it will be understood that user environments may be integrated and/or embedded within third party social/professional networking services, for example, Facebook® or LinkedIn®. Moreover, the NCMC Controller 4 may be implemented in one or more computing systems associated with third party social networking services. In addition, the stored persistent data associated with users' accounts, project data, and/or task data may co-exist, within any storage mechanisms implemented by third party social/professional networking services or associated with third party social/professional networking services.

Figure 2:
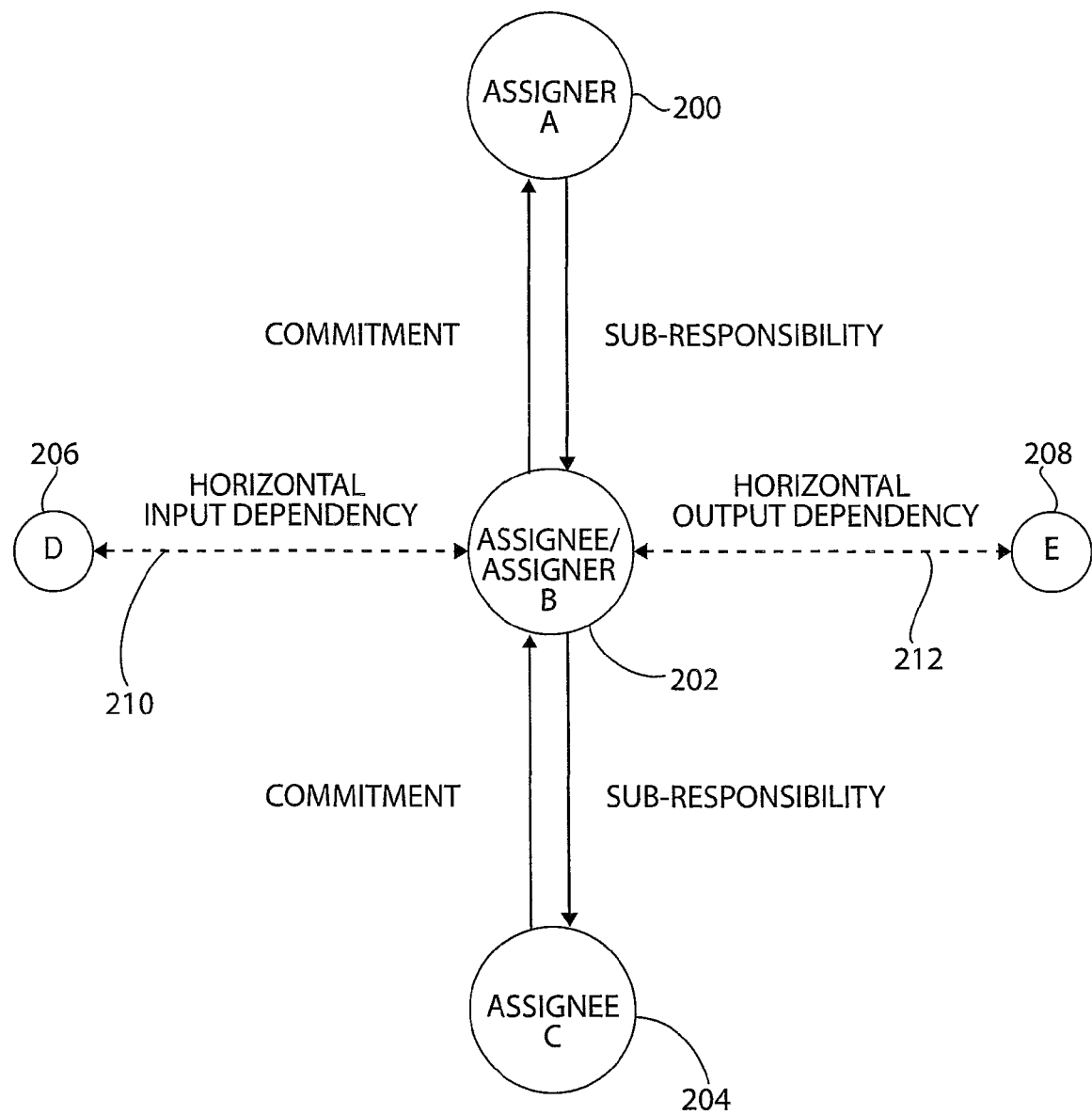
FIG. 2 illustrates an embodiment of the assignment of responsibility to one or more individual nodes within the NCMC System.

FIG. 2 illustrates an embodiment of the assignment of responsibility to one or more individuals within the NCMC System 2. Individual nodes, for example, Assigner A 200, Assignee/Assigner B 202, Individual Node D 206, Individual Node E 208, and Assignee C 204, as described herein are representative of individuals inside and/or outside an organization, for example, a corporation. The individual nodes may be any individual that may be responsible for or obligated to an organizational commitment where the organizational commitment may include but is not limited to a project, a task, a process, a step or any objective or discrete unit of work that must be accomplished or performed by at least one individual to satisfy the needs of internal and/or external customers of an organization. In the NCMC System 2, although it will be appreciated that any individual with responsibility may use the NCMC System 2, a category of users are provided to assist in defining a structure within the communication network. Accordingly, in the NCMC System 2, the Responsibility Assignment User 30 may include any person with project level or lower responsibility and may be assigned one or more responsibilities that the person must complete or perform by themselves or sub-delegate or sub-assign to others which may include, but is not limited to Project Managers and/or Task Managers of organizations. The Support Services User 34 may include any person with the responsibility or the authority to oversee or perform one or more supportive responsibilities i.e., one or more standard process level or lower responsibility which is performed with some periodicity or as a standard operation within an organization, such as the procurement of a deliverable or periodic upgrades, and maintenance of purchased software used within the organization. The Personnel Manager may include any person with the responsibility or the authority to oversee the workload of one or more responsible individuals within an organization. The Executive Oversight User 36 may include any officer with one or more responsibilities to oversee one or more projects within an organization or any person that has the authority to view or oversee one or more projects within the organization. Thus, in general, each individual may be accountable for one or more responsibilities or assigned one or more responsibilities that must be accomplished or performed by either the individual themselves or, depending upon whether the individual is accountable for one or more project level responsibilities, one or more standard process level responsibilities or one or more step task level responsibilities, breakdown, separate, divide, or split the project level responsibilities, task level responsibilities or start process level responsibilities into one or more sub-responsibilities, i.e., tasks, sub-tasks or steps that may be subsequently assigned or delegated to other individuals with the capacity and experience to complete the sub-responsibility.

Any individual, with proper user permissions data, may also create one or more responsibilities by for example, creating one or more projects, tasks, standard processes, or steps within the NCMC System 2. A project in the NCMC System 2 may be created to represent the breakdown of the work effort into one or more sub-responsibilities i.e., tasks as required to satisfy a customer request by a customer. The customer may be an external corporation or an internal unit of the corporation satisfying the request. It will be appreciated that each task may be further broken down into one or more tasks as justified by the work required. A standard process in the NCMC System 2 may be created to represent an operational procedure that is performed to satisfy ongoing or repetitive responsibilities. For example, a standard process may include, but is not limited to, the application of a software patch or upgrade to a purchased software tool. However, it will be appreciated that unlike tasks which may be further broken down into one or more tasks or sub-tasks and continuing on as necessary or justified by the work required, the standard process may only be broken down into a series of steps where the standard process is representative of a specific instance and steps being representative of the required step or segment to complete that instance of the standard process. Continuing with the above non-limiting example of the software patch or update to a purchased software tool, the steps may include, but are not limited to, the installation of a software patch or periodic update of the purchased software tool which may be the same step for every patch or upgrade that is applied. Just like tasks, each step may be assigned as a responsibility to a specific individual. Further, it will be understood that responsibilities such as projects may be grouped into one or more programs each having an associated program name.

In one non-limiting exemplary embodiment, the individual user may create a project in the NCMC System 2 by providing or inputting a project name, project type, project status, the project priority, the responsible individual's name, the scheduled dates, the promised dates, and eventually, the actual dates of the project. In addition, the projects may include one or more tasks wherein each task is associated with one or more deliverables. The deliverables may include, but are not limited to, a specific product or service, either tangible or intangible, that are produced at the completion of the task and/or project. The NCMC System 2 may then save, store, and/or archive the project related information as project data and/or task data within one or more databases in the NCMC System 2 after the creation of one or more projects or tasks. After the creation of any responsibility, for example, a project, the NCMC System 2 may also notify the one or more responsible individuals identified in the respective responsibility data, for example, project data, and send notifications to the responsible individual in any of the mechanisms described herein. However, the creator of the responsibility may not be notified by the NCMC System 2. It will be appreciated that the individual user may create other responsibilities and/or sub-responsibilities, such as tasks, standard processes, or steps by inputting and or entering one or more associated information for the particular responsibility or sub-responsibility as requested by one or more environments provided by the NCMC System 2 and transmitting, sending, and/or submitting the associated information for the particular responsibility to the NCMC System 2.

Optionally, each responsibility may also be associated with one or more horizontal interdependencies. Horizontal interdependencies may include one or more horizontal input dependencies 210 and/or one or more horizontal output dependencies 212. A horizontal input dependency 210 occurs when one or more pre-requisite responsibilities, conditions, resources, and/or deliverables that must be completed or satisfied before the individual having a responsibility may begin or finish their assigned responsibility. Horizontal output dependency 212 occurs when one or more responsibilities is dependent upon the current responsibility held by the individual and the conditions, resources, and/or deliverables must have occurred, freed, and/or been completed by the current responsibility held by the individual before a dependent responsibility may begin or finish.

In the NCMC System 2, an assignor node, for example, Assignor A 200, may have one or more responsibilities where each responsibility may be associated with one or more objectives identified in the requirements that must be fulfilled. As a holder of responsibility, the assignor node may delegate or assign one or more sub-responsibilities to an assignee node, such as, for example Assignee/Assignor B 202. The assignee node, for example, Assignee/Assignor B 202, in response to the assigned sub-responsibility, may gain an understanding of the sub-responsibility requirements, the alignment of enterprise objectives, the commitment for specific deliverables and commit to the scheduled date of completion of the responsibility from the assignor node, for example, Assignor A 200 within the NCMC System 2. In a non-limiting exemplary embodiment, an assignee node, for example, Assignee/Assignor B, 202 may commit to a responsibility within the NCMC System 2 by entering, modifying, and/or updating the promised start and promised end dates of the assigned responsibility to conform to the scheduled start and scheduled end date provided by the assignor node, for example, Assignor A 200, to the NCMC System 2. After the responsibility has been committed, the assignee node, for example, Assignee/Assignor B 202 may identify one or more interdependencies within the NCMC System 2 with other individual nodes, for example, Node D 206 and/or Node E 208 in the NCMC System 2. After the assignee node, for example, Assignee/Assignor B 202 identifies one or more interdependencies, the assignee node may link their current responsibilities within the NCMC System 2 with one or more horizontal interdependencies, for example, Node D 206 and/or Node E 208.

Alternatively, based on the understandings and determinations of the assignee node, for example, Assignee/Assignor B 202, the assignee node may also negotiate the requirements of the responsibility, for example, new promised date for the responsibility and commit to the new promised date for the responsibility within the NCMC System 2. In another non-limiting exemplary embodiment, the assignor node, for example, Assignor A 200, may modify and/or update the scheduled dates for the assigned responsibility and in response, the assignee node, for example, Assignee/Assignor B 202 modifies and/or updates the promised start date and promised end date to conform with that of the modified and/or updated scheduled dates thereby committing to the responsibility. Moreover, to determine or calculate whether the scheduled and promised dates are in conformity, the NCMC System 2 may compare the promised start date and promised end date is equal to or less than the scheduled end date. Therefore, if the promised end date is equal to or less than the scheduled end date, then the NCMC System 2 may determine that the dates are in conformity and the NCMC System 2 may indicate in the respective environments for each user or individual, for example, the Assignor A 200 and/or Assignee/Assignor B 202, that the responsibility has been committed by the assignee node, for example, Assignee/Assignor B 202. After a commitment is made by the assignee node, for example, Assignee/Assignor B 202 and approved by the assignor node, for example, Assignor A 200, a vertical interdependency is formed between the responsibility of the assignor node and the sub-responsibility of the assignee node, and the assignee node becomes a holder of responsibility. In response, the NCMC System 2 may create and/or generate dependency data based on the vertical dependency link between the responsibility and assigned sub-responsibility and save store and/or archive the created and/or generated dependency data in Database 10 of FIG. 1.

As a new holder of responsibility, the assignee node, for example, Assignee/Assignor B 202, is a child node within the organizational commitment's hierarchy of objectives where the assignor node is the parent node. The assignee node, for example, Assignee/Assignor B 202, may separate or break down the assigned responsibility into a discrete set of sub-responsibilities and further delegate or assign one or more sub-responsibilities to other individual nodes, for example, Assignee C 204 thereby becoming an assignor node with respect to the other individual node, such as, for example Assignee C 204. As more and more individual nodes receive responsibilities, break down their responsibilities into sub-responsibilities, and delegate or assign their sub-responsibilities to other individual nodes, a sub-network of individuals working on interdependent responsibilities that is interconnected by vertical and horizontal interdependencies is formed within the NCMC System 2. Therefore, in accordance with one objective of the present invention, the network of interdependences form the backbone of the socially connected structured communications network in the NCMC System 2 where each dependency link between the interdependencies creates or sets up a communications link between those individual nodes responsible for completing interrelated responsibilities or sub-responsibilities.

Additionally, users or individuals within the NCMC System 2 may be connected by interrelated responsibilities where each responsibility may create or set up one or more communications link to other unique individuals regardless of organization and geographic boundaries. In one non-limiting exemplary embodiment of FIG. 2, the Node D 206 may be a Responsibility Assignment User 30 at company D located in city D responsible for manufacturing a widget, the Assignee/Assigner B may be Responsibility Assignment User 30 at company B located in city B who is assigned the sub-responsibilities of receiving the widget from Node D 206, modifying the widget, and supplying the widget to Node E 208 by Assigner A 200, a Personnel Manager User 32, at company A located in city A, where Node E may be an Personnel Manager User 32 at company E located in city E. Additionally, modification of the widget may further be broken down into sub-responsibilities where one such sub-responsibility may be assigned to Assignee C 204 who may be a Responsibility Assignment User 30 or Support Services User 34 at company C located in city C. The interrelated responsibilities of receiving, modifying, and supplying the widget may create or setup a communication link from Assignee/Assignor B 202 to Node A 200, Node D 206, Node E 208, and Node C 204. The communications link may then be used by the NCMC System 2 to provide real time status updates and/or notifications of responsibilities and/or sub-responsibilities to affected users or individuals regarding their status so that appropriate corrective action may be taken before one or more commitments to requirements are broken when one or more commitments of a responsibility are modified and/or updated by any of their responsible or accountable users or individuals. It will be appreciated that as one or more responsibilities are completed by individuals, dependency data associated with horizontal and vertical dependencies of one or more interrelated responsibilities for the completed responsibility may be removed and/or deleted and consequently, severing the communication link between the interrelated responsibility holders. Thus, as nodes connect based on their interconnected responsibilities with other nodes and disconnect from their nodes as responsibilities are completed, a dynamic social network among users and individuals is formed within the NCMC System 2.

Figure 3:
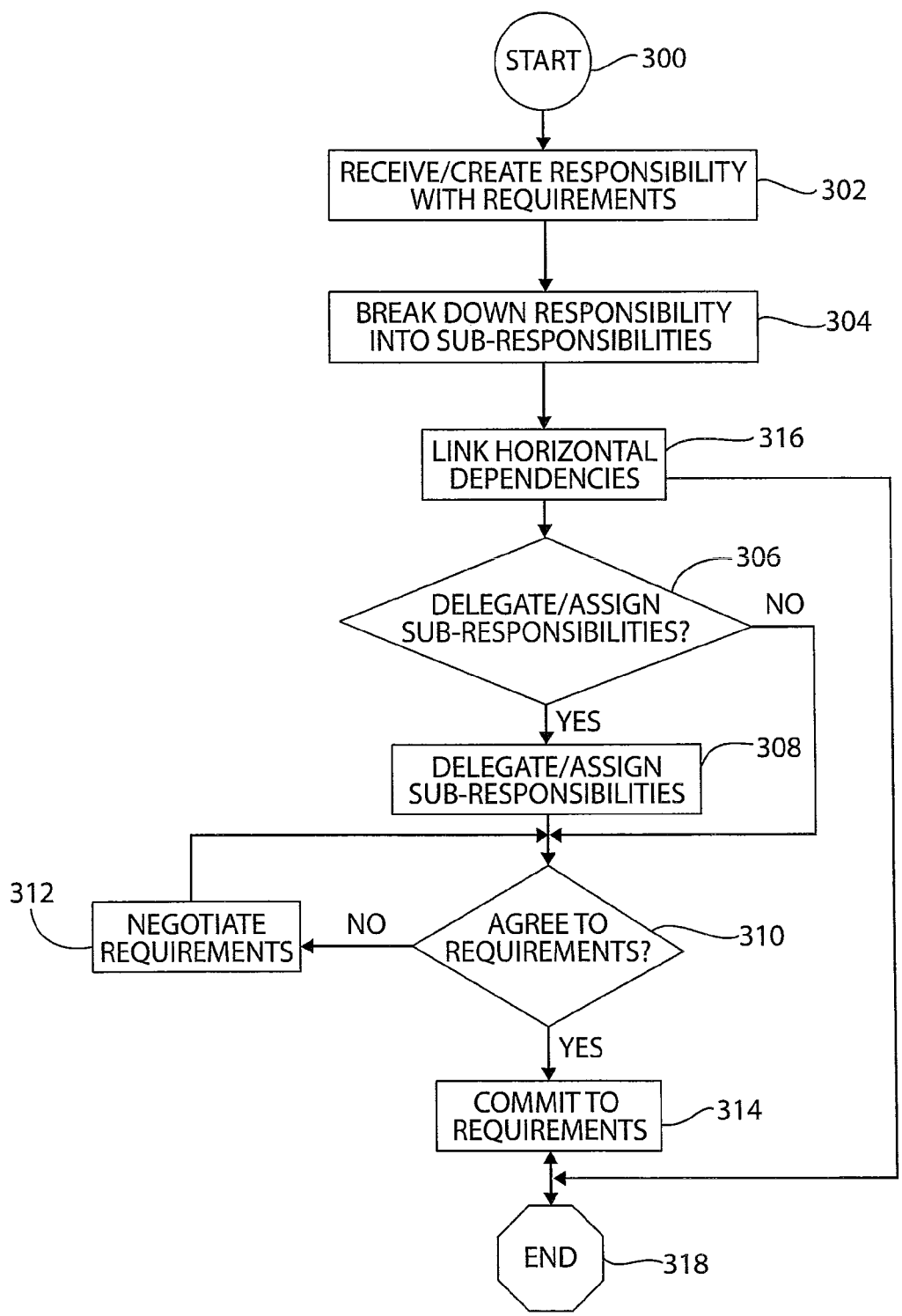
FIG. 3 illustrates an embodiment of a logic flow for an individual node after assignment of responsibility within the NCMC System.

FIG. 3 illustrates an embodiment of a logic flow for an individual node after assignment of responsibility within the NCMC System 2. Assignment of responsibility at an individual node starts (step 300) with the individual node receiving or creating a new responsibility (step 302), such as a new project, task, standard process, and/or step in the NCMC System 2. Each responsibility may also have a set of associated requirements, which may include, but is not limited to, the output of the responsibility, i.e., a deliverable, a description of the responsibility, the responsibility's business objective, value of responsibility, objective of the responsibility, scheduled dates, promise dates and/or actual dates. It will be understood that some requirements may be negotiable and/or modifiable within the NCMC System 2 by the individual node assigned the responsibility, i.e., the assignee node with respect to the responsibility. The NCMC System 2 after notifying the responsible individual of the new project, may transmit, send, communicate, and/or output the newly assigned responsibility in the appropriate environment for the particular individual node. In a non-limiting exemplary embodiment, if a new project is assigned to a Responsibility Assignment User 30 such as, for example the Project Manager by an Executive Oversight User 36, then the NCMC System 2 may first notify the Project Manager of the new project via any of the mechanisms previously described. Upon access of the NCMC System 2 by the Project Manager via the Responsibility Assignment Environment 20, the NCMC System 2 may transmit, send, communicate, and/or output, the newly assigned responsibility to the Responsibility Assignment Environment 20 for display to the Project Manager. Additionally, the newly assigned project may also contain one or more requirements, for example, a scheduled start date and a scheduled end date of the project, viewable within the Responsibility Assignment Environment 20 by the Project Manager. However, to empower each individual in managing their own assigned responsibility in accordance with another object of the present invention, the promised or committed start date and end date of a particular sub-project level responsibility may not be entered, modified, and/or updated by the individual assigning the responsibility, i.e., the assignor node. Rather, the NCMC System 2 may enable only the individual accountable for the assigned responsibility i.e. the assignee node to input or provide the promised or committed start date, and the promised or committed end date, the actual start date and the actual end date for the assigned responsibility.

As with any complex undertakings involving disparate organization, partners, teams, and multiple levels of suppliers, inevitable changes may occur throughout various phases of a large enterprise which may affect one or more promised or committed dates for one or more responsibilities. Therefore, to provide transparency of responsibility status to all individuals that may be affected by changes to one or more responsibilities, the NCMC System 2 may provide one or more monitors to the environments for display to the individuals. The one or more monitors may include, but are not limited to, workload (not shown), responsibility status, a current progress indicator, and/or one or more status indicators for each responsibility. The responsibility status may be configured by any individual with access permission. The responsibility status indicators may include, but are not limited to, whether the responsibility is currently scheduled, started, and/or completed, and/or suspended. The current progress indicator may include an aggregate numerical value that is indicative of the amount of work already performed for a particular responsibility. The workload may include, but is not limited to a numerical value indicating the estimated number of hours and days required for an associated responsibility. The status indicators may include a Time Line Indicator, a Budget Indicator, a Resources Indicator, an Issues Indicator, and a Risks Indicator. The NCMC System 2 may calculate the Time Line Indicator based on the scheduled, promised, actual, and sub-task dates for an associated responsibility. Moreover, in one non-limiting exemplary embodiment, the NCMC System 2 may compare the scheduled, promised, actual, and sub-task dates, and provide an aggregate severity indicator for the particular responsibility. The Budget, Resources, Issues, and Risks Indicator may be set by the individual nodes accountable for the particular responsibility to provide notice and visibility to all individual nodes linked by interdependences of a particular responsibility on any budget matters, any resource matter, particular issues, and/or risks for that particular responsibility. In another non-limiting exemplary embodiment, each indicator may be a color coded circle displayed in proximity or associated with each responsibility in the respective environments. Alternatively, at least some status indicators may include semi-circles with one half representing the current status of the particular responsibility, and the other half representing an aggregate status of the particular responsibility without consideration of any sub-responsibilities including the status of any interdependent responsibilities. Each color may be associated with a particular severity of the status for a particular status indicator. In a non-limiting exemplary embodiment, the red colored indicator may indicate the most severe condition for a particular status whereas a green color indicator may indicate that there are no outstanding issues of any concern for the particular status. It will be appreciated by those skilled in the art that indicators may not be limited to color coded circles and/or semi-circles as any other means to place the user on notice regarding particular issues of one or more responsibilities may be appreciated, for example, a one or more numerical score in a fixed range for each indicator.

In one embodiment, an individual node with a newly assigned responsibility may further clarify their assigned objectives for the responsibility by creating a Work Breakdown Structure (WBS). A WBS is a deliverable-oriented hierarchical decomposition of work to be produced, executed, and/or performed. Individual nodes may break their assigned responsibility into one or more sub-responsibilities (step 304). In particular, the individual nodes may breakdown a project, a task or a standard process within the NCMC System 2, into discrete set component parts, where each part may fulfill the objective of the assigned responsibility. Based on the WBS for the assigned responsibility, the individual node may add one or more tasks or sub-tasks, in the NCMC System 2, within their assigned responsibility, for example, their assigned project to track progress of individual tasks within their assigned responsibility where each individual task may produce one or more deliverables that fulfills each individual task's objectives. Similar to other responsibilities, each task or sub-task may also be associated with one or more requirements which, as previously described, may include, but are not limited to, the output of the responsibility, i.e., a deliverable, a description of the responsibility, the responsibility's business objective, value of responsibility, objective of the responsibility, scheduled dates, promise dates, and/or actual dates. To facilitate the individual nodes in assigning their sub-responsibility in the NCMC System 2, the NCMC System 2 may provide a planner, which enables the individual nodes to add new tasks or sub-tasks and/or calculate a scheduled start and end date for each task or sub-task based on duration of the parent responsibility and lead times or lag times. Each task or sub-task added may be saved, stored, and/or archived by the NCMC System 2 in one or more databases within the NCMC System 2 as task data.

In the embodiment of FIG. 3, after responsibilities have been broken down into sub-responsibilities, the sub-responsibilities may be provisionally assigned or delegated to a responsible individual node (step 306). Accordingly, the NCMC System 2 may provide in the respective environments of individuals, input fields, boxes, and/or other areas associated with the sub-responsibility for provisional assignment of one or more sub-responsibilities to one or more individual nodes. Additionally, the NCMC System 2 may receive the provisional assignments of sub-responsibilities to individual nodes from respective environments, and store the provisional assignments in one or more databases.

In the embodiment of FIG. 3, after the provisional assignments for responsibilities have been entered and/or saved, stored, or archived within the NCMC System 2, the individual node may choose to implement the provisional assignment by delegating or assigning the responsibility (step 308) to one or more responsible users or individuals such that the one or more responsible individual nodes may also receive one or more responsibilities where each responsibility is associated with a set of requirements. As previously described, the NCMC System 2 may provide notifications to the newly assigned responsible individual to notify him or her of the newly assigned responsibility and transmit, send, and/or output the newly assigned responsibility in the respective user environment for display to the individual node. The NCMC System 2 may then perform the logic flow of FIG. 3 described herein based on, at least partially, the individual node's inputs in their respective environment.

Based on, at least partially, each individuals work load, work experience, scheduling conflicts, and/or other factors that may affect the individual's velocity or capability to perform work, the individual may negotiate one or more requirements (step 312) with the individual who assigned the responsibility i.e. the assignor node. Therefore, in accordance with another object of the present invention, the individual nodes may negotiate requirements (step 312) which may include, but is not limited to a promise or committed start date and/or promise or committed end date with their respective assignor node for their responsibilities and based on the negotiation, input one or more promised or committed dates within the NCMC System 2. In response, the NCMC System 2 may update the requirements data of the responsibility with the promised or committed dates and transmit, send, and/or output the updated requirements data including the promised or committed dates to the assignor node for display. As previously described, if the user or individual provided schedule dates and promise dates are in conformity, then it is understood that the requirements of the responsibility are committed (step 314) To facilitate negotiation between individual nodes, the NCMC System 2 may also provide one or more real time synchronous conferencing mechanisms. In a non-limiting exemplary embodiment, the NCMC System 2 may enable either the assignor node and/or the assignee node to schedule and/or initiate a real time conference using a text messaging conference or a real time voice communications protocol, for example, Voice Over Internet Protocol (VOIP) between the nodes for further negotiation on one or more requirements between individual nodes. Alternatively, in another non-limiting exemplary embodiment, the NCMC System 2, may also provide or create meeting requests in between the individual nodes and send e-mail notifications for meeting request using the e-mail server 8.

After the responsibility with requirements has been committed (step 314), and sub-responsibilities, if any, are broken down into one or more sub-responsibilities and, optionally, assigned to other individual nodes, the individual node may identify and link one or more horizontal interdependencies (step 316) within the NCMC System 2 and create a dependency link between the other responsibilities and the newly committed responsibility. Various types of dependency links may be created within the NCMC System 2. Accordingly, based on the specific nature of the responsibilities, the dependency link may be created for finish to start, start to finish, start to start, or finish or finish. Finish to start dependency link may be created when a second responsibility cannot begin before the first responsibility is completed. Start to finish dependency link may be created when the second responsibility cannot be completed before the first responsibility begins. Start to start dependency link may be created when the second responsibility cannot begin before the first responsibility begins. Finish to finish dependency may be created when the second responsibility cannot complete before the first responsibility completes. To facilitate the user in linking tasks and creating dependencies, the NCMC System 2 may retrieve from one or more databases a list of all projects, tasks, and sub-tasks stored within NCMC System 2 and transmit, communicate, send, and/or output one or more projects and tasks for display to the individual in their respective environments. The individual may then select one or more tasks displayed and link the selected task to an existing task based on a selected dependency type. The NCMC System 2, in response, may create a communication link between those individuals responsible for completing the tasks, which may be used by the NCMC System 2 to notify the individuals, in real time, of one or more material changes that may affect at least one commitment date of one or more responsibilities. Additionally, the individual nodes may also modify the lead time or lag times in a specified unit of time (days, weeks, and/or months) associated with each interdependent responsibility. After a dependency link is created, the NCMC System 2 may receive the dependency link data from respective environments, save, store, and/or archive the dependency link in one or more databases as dependency data, and associate the dependency link between one or more interdependent responsibility.

Figure 4:
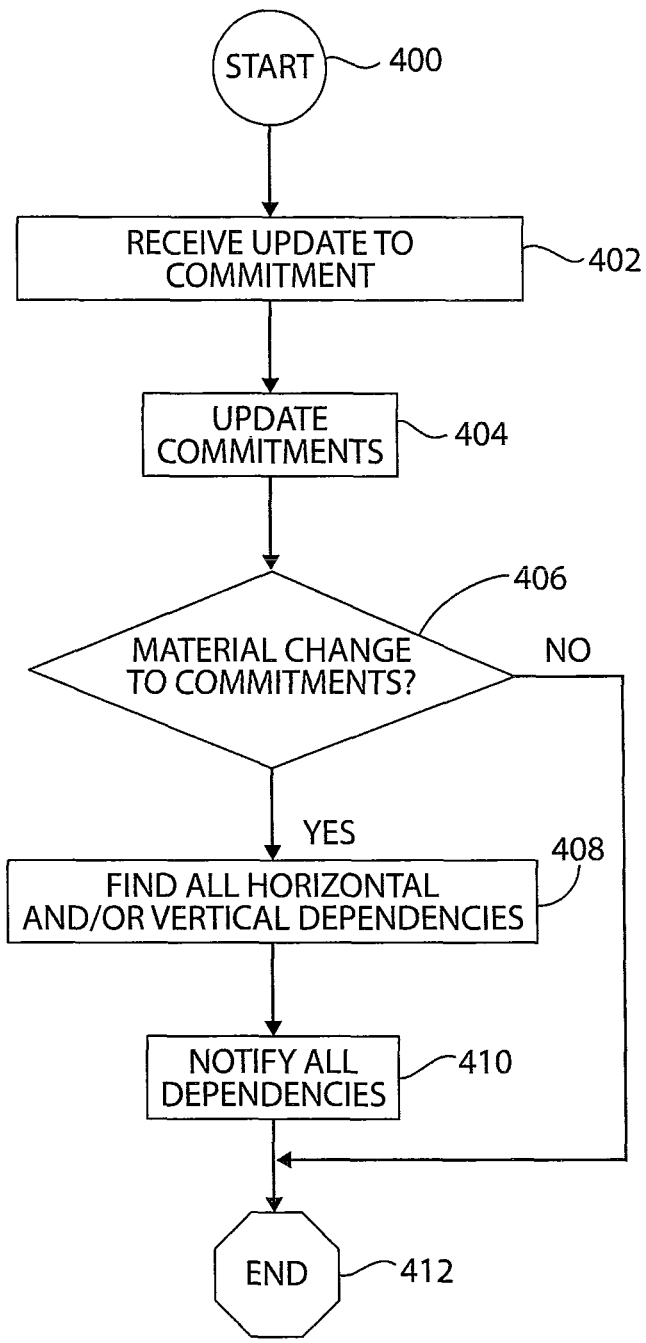
FIG. 4 illustrates an embodiment of updating and notifying all linked interdependencies when requirements associated with each responsibility are updated by an individual node within the NCMC System.

FIG. 4 illustrates an embodiment of a logic flow for updating and notifying all linked interdependencies when requirements associated with each responsibility are updated by an individual node within the NCMC System 2. As previously described herein, another object of the present invention is to provide real time updates of changes during the various phases of large undertakings that may affect one or more responsibilities held by one or more individuals across various organizational boundaries. In one embodiment of FIG. 4, an individual node who is assigned a responsibility may start (step 400) by updating one or more requirements associated with the assigned responsibility and in response, the NCMC System 2 may receive the update to the requirements for the commitment (step 402), and update the requirements to commitments accordingly (step 404). In a non-limiting exemplary embodiment, the individual node may reschedule or recommit a promised date for a responsibility of a particular task within the NCMC System 2. The NCMC System 2 may receive the updated promised dates for the particular responsibility of the individual node and update the promised dates stored in one or more databases within the NCMC System 2. Based on whether the update or recommitment to the requirements constitutes a material change (step 406), i.e., affect one or more interdependent responsibilities, the NCMC System 2 may find or identify all horizontal and/or vertical interdependencies (step 408) for a particular responsibility and notify, using any of the mechanisms previously described herein, all horizontal and/or vertical interdependencies (step 410) regarding the material change to a requirement for a particular responsibility. Moreover, based on the horizontal interdependency type between two responsibilities, the NCMC System 2 may calculate and/or update the Time Line Indicator for the recommitted responsibility. To provide affected individuals with the most up-to-date status on their affected responsibilities, the NCMC System 2 may also calculate and/or update the Time Line Indicator for one or more interrelated responsibilities and transmit, send, and/or output the newly determined Time Line Indicator to environments for display to the individuals. Additionally, notifications as previously described herein may be sent to affected individuals regarding the Time Line indicator for a particular responsibility accountable or responsible by the affected individual.

In another embodiment of FIG. 4, if the status indicator update is one of Budget Indicator, Resources Indicator, Issues Indicator, and Risks Indicator, the NCMC System 2 may require the responsible individual node for the responsibility to provide an explanation or comment regarding the particular status indicator update if the particular status indicator update is below a predetermined threshold. In one non-limiting exemplary embodiment, if an individual node updates the Budget Indicator by downgrading below a certain predetermined threshold, the NCMC System 2 may prompt the individual node for input, such as an explanation or comment on the newly updated status. The NCMC System 2 may receive the newly updated status including explanation or comment and save, store, and/or archive the status indicator update and any corresponding explanation or comment in one or more databases. To provide affected individuals with the most up-to-date status on their affected responsibilities, the NCMC System 2 may also transmit, send, and/or output the newly updated status indicator including any explanation or comments to environments for display to the affected individuals. Additionally, notifications as previously described herein may also be sent to affected individuals regarding the status indicator for a particular responsibility accountable or responsible by the affected individual.

In another embodiment of FIG. 4, to further facilitate communications between the affected individuals regarding a particular status update, the NCMC System 2 may also provide one or more real time synchronous conferencing mechanisms as previously described. In a non-limiting exemplary embodiment, the NCMC System 2 may enable any of the affected individuals to schedule and/or initiate a conference using a real time text messaging conference or a real time voice communications protocol, for example, Voice Over Internet Protocol (VOIP) between all affected individuals.

It will be understood that the NCMC System 2 may send or receive notifications not only in response to commitment updates as those illustrated with respect to the logic flow of FIG. 4. In one non-limiting embodiment, the NCMC System 2 may send notifications based on one or more system events in the NCMC System 2. In one non-limiting exemplary embodiment, the NCMC System 2 may send notifications via any of the mechanisms previously described herein to notify users and individuals of their upcoming promised dates before the date of their promised date. The number of dates to notify users and individuals may be predetermined by the NCMC System 2 or may be updated, modified, and/or configured by the user and/or individual in their respective environments. In another non-limiting embodiment, a user event may be created within the NCMC System 2 which may alert a user based on one or more pre-defined trigger events within the NCMC System 2. In another exemplary embodiment, notifications may be sent using any of the previously described mechanisms when a particular user or individual has not logged into the NCMC System 2 within a defined set number of days.

Figure 5B:
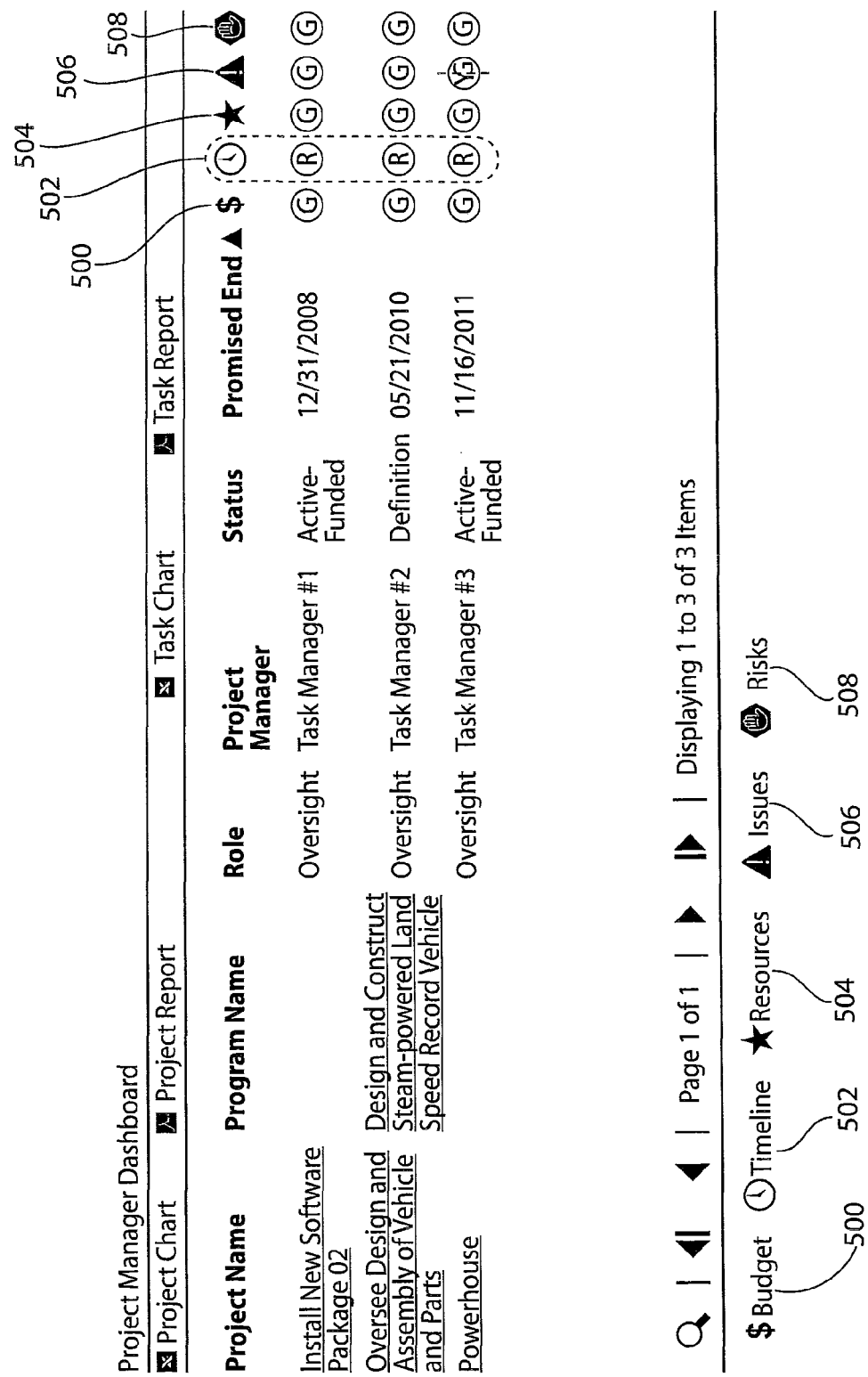

FIGS. 5a-5b illustrate exemplary embodiments of the NCMC System 2 user interface. As illustrated in FIGS. 5a-5b, NCMC System 2 may send, transmit, and/or output project data and task data to various environments to display a list of responsibilities such as projects, tasks, standard processes, and/or steps and various indicators associated with each responsibility, and/or one or more requirements, such as scheduled dates and promised dates to the individuals. It will be appreciated that the individuals responsible or accountable for a particular responsibility may select one or more responsibility they are accountable or responsible for and view and/or edit the selected responsibility. However, as previously described herein, the NCMC System 2 may only enable the individual that is the responsible or accountable individual for the responsibility to edit their assigned responsibility such as, for example, the promised dates. Editing of responsibilities within the NCMC System 2 may include, but is not limited to, updating, modifying, and/or providing one or more requirements for projects and/or tasks as previously described herein.

FIGS. 5a-5b also illustrates embodiments of various charts of responsibilities, for example, project chart, task chart, standard process chart, and/or steps chart that may be provided to the user or individuals in various environments. The charts may include, but is not limited to, a Gantt chart which is color coded to highlight issues at various levels of the responsibility and selecting or clicking the particular responsibility may display the responsibility's edit screen. Additionally, the NCMC System 2 may also provide various reports of responsibilities, for example, project report, task report, standard process report, and/or steps report to the users or individuals in various environments. The report may include all the relevant data regarding the respective responsibility and any of the relevant data of sub responsibilities of the respective responsibility.

FIGS. 5a-5b also illustrate exemplary embodiments of the various status indicators which may include, but are not limited to, a Time Line Indicator 502, a Budget Indicator 500, a Resources Indicator 504, an Issues Indicator 506, and a Risks Indicator 508. As previously described herein, the NCMC System 2 may calculate the Time Line Indicator 508 based on the scheduled, promised, actual, and sub-task dates for an associated responsibility. Additionally, as previously described herein, each indicator may be a color coded circle displayed in proximity or associated with each responsibility in the respective environments, where the color green (G) indicates that there are no outstanding issues of concern, the color yellow (Y) may indicate moderate issues, and the color red (R) may indicate severe issues of concern. Also, as previously described herein, at least some status indicators may include semi-circles with one-half representing the current status of the particular responsibility and the other half representing an aggregate status of the particular responsibility without consideration of any sub-responsibilities, including the status of any interdependent responsibilities wherein each color may be associated with a particular severity of the status for a particular status indicator. FIG. 5b, with respect to the Issues Indicator 506 for the Powerhouse project, illustrates an exemplary semi-circle status indicator.

Individuals may also select one or more responsibilities by clicking the name of the responsibility and view any of the responsibilities linked by vertical interdependencies or horizontal interdependencies. In a non-limiting exemplary embodiment, the NCMC System 2 may also indicate, for example, by highlighting any linked interdependencies that may have one or more status indicators with severity grade below a predetermined threshold such that individuals may quickly determine and identify a specific issue with one or more responsibilities. Additionally, the NCMC System 2 may also schedule and/or initiate a real time conference between affected individuals in response to an individual selection of one or more responsibilities assigned to one or more affected individuals.

Unless specifically stated otherwise, it may be appreciated that terms such as "processing," "computing," "calculating,"

"determining," "providing," "updating" or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers, or other such information storage, transmission, or display devices.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. It also can be appreciated that while a logic flow may illustrate a certain sequence of steps, other sequences of steps may also be performed according to alternative embodiments. Moreover, some individual steps of a logic flow may include multiple sub-steps that may be performed in various sequences as appropriate to the individual step. Furthermore, additional steps may be added or some steps may be removed depending on the particular implementation.

In addition, the logic flow may be implemented by a hardware Clement, a software element executed by a computer, a firmware element embedded in hardware, or any combination thereof. In various embodiments, the logic flow may comprise, or be implemented as, executable computer program instructions. The executable computer program instructions may be implemented by software, firmware, a module, an application, a program, a widget, a subroutine, instructions, an instruction set, computing code, words, values, symbols, or combination thereof. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The executable computer program instructions may be implemented using any suitable high-level, low-level, object-oriented, visual, compiled, and/or interpreted programming language in accordance with the described embodiments.

In various embodiments, a logic flow may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments. In such embodiments, a computer may include any suitable computer platform, device, system, or the like implemented using any suitable combination of hardware and/or software.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Additionally, the article and/or computer-readable storage medium may be of the non-transitory type. Examples of computer-readable storage media may include, but are not limited to, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

In various embodiments, the account associated with each user, for example, the Responsibility Assignment User 30, the Personnel Manager 32, the Support Services User 34, and/or the Executive Oversight User 36 may be stored within the article and/or computer-readable storage medium and organized in one or more databases. The process of "updating" and/or "modifying" the accounts associated with various users described in various embodiments may include reading, writing, and/or modifying the account information and/or associated persistent data stored within the article and/or computer-readable storage medium that may be organized into one or more databases. Additionally, any persistent data described herein that may be associated with various user accounts or within various user accounts may also be stored in one or more databases.

Figure 6:
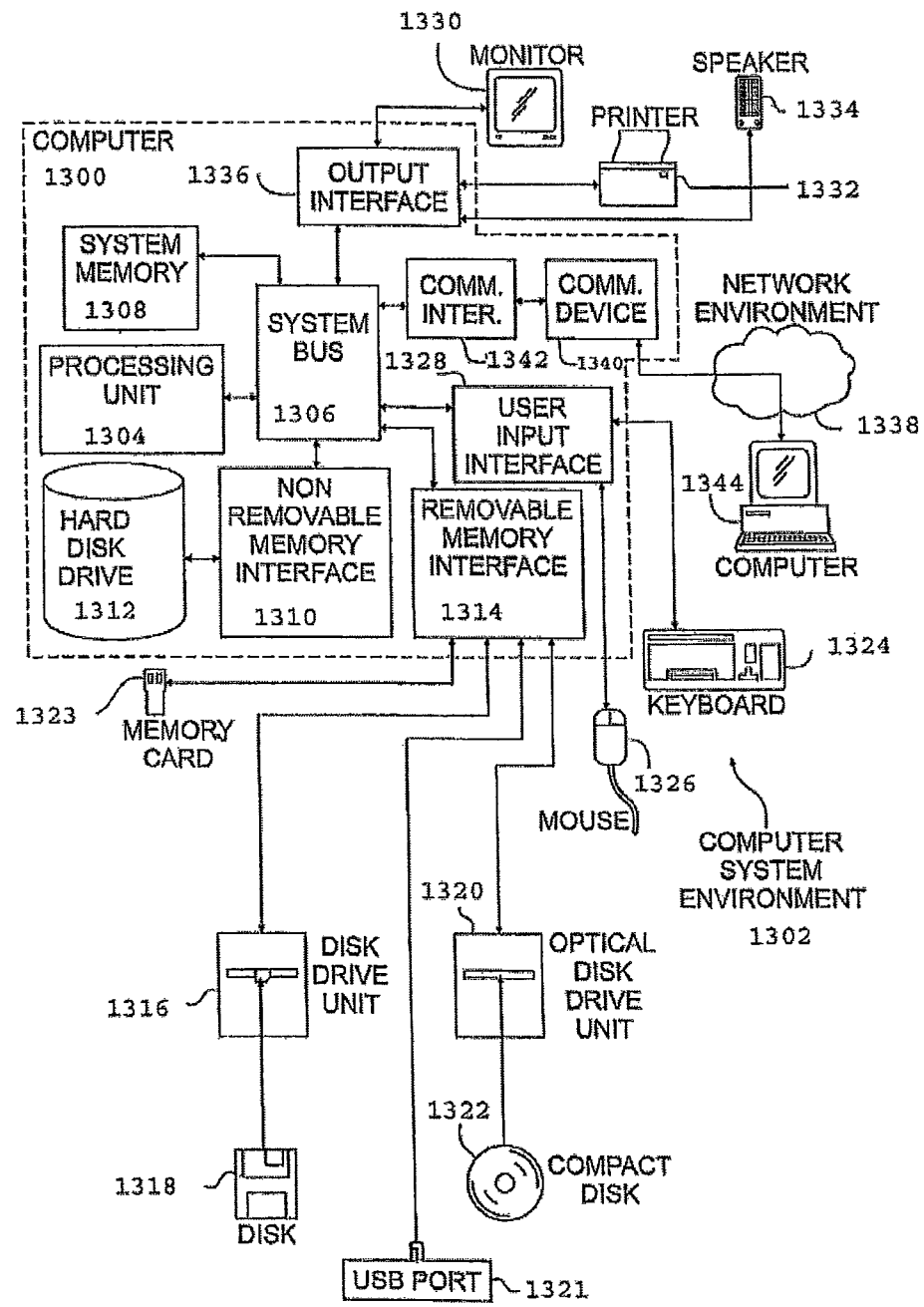
FIG. 6 illustrates an embodiment of a computer system used in the present invention.

In various embodiments, the present invention or portions of the present invention, for example, NCMC System 2, may be implemented on a variety of computing devices and systems, wherein these computing devices include the appropriate processing mechanisms and the article and/or the computer-readable storage medium for storing and executing computer-readable instructions, such as programming instructions, code, and the like. For example, NCMC Controller 4 may be implemented in a web server running one or more processes, for example, web server applications, to respond to various requests, for example, HTTPS, HTTP, and/or FTP, from remote browsers on computers, such as computer 1344 of FIG. 6. Through HTTP, the exchange system may provide the user interface graphics to various embodiments. As shown in FIG. 6, personal computers 1300, 1344, in a computing system environment 1302 are provided. This computing system environment 1302 may include, but is not limited to, at least one computer 1300 having certain components for appropriate operation, execution of code, and creation and communication of data. For example, the computer 1300 includes a processing unit 1304 (typically referred to as a central processing unit or CPU) that serves to execute computer-based instructions received in the appropriate data form and format. Further, this processing unit 1304 may be in the form of multiple processors executing code in series, in parallel, or in any other manner for appropriate implementation of the computer-based instructions.

In order to facilitate appropriate data communication and processing information between the various components of the computer 1300, a system bus 1306 is utilized. The system bus 1306 may be any of several types of bus structures, including a memory bus or memory controller, a peripheral bus, or a local bus using any of a variety of bus architectures. In particular, the system bus 1306 facilitates data and information communication between the various components (whether internal or external to the computer 1300) through a variety of interfaces, as discussed hereinafter.

The computer 1300 may include a variety of discrete computer-readable media components. For example, this computer-readable media may include any media that can be accessed by the computer 1300, such as volatile media, non-volatile media, removable media, non-removable media, etc.

As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 1300. Further, this computer-readable storage medium may include communications media, such as computer-readable instructions, data structures, program modules, or other data in a modulated data signal, such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, etc.). Of course, combinations of any of the above should also be included within the scope of computer-readable media.

The computer 1300 may further include a system memory 1308 with computer storage media in the form of volatile and non-volatile memory, such as ROM and RAM. A basic input/output system (BIOS) with appropriate computer-based routines assists in transferring information between components within the computer 1300 and is normally stored in ROM. The RAM portion of the system memory 1308 typically contains data and program modules that are immediately accessible to or presently being operated on by processing unit 1304, e.g., an operating system, application programming interfaces, application programs, program modules, program data and other instruction-based computer-readable codes.

With continued reference to FIG. 6, the computer 1300 may also include other removable or non-removable, volatile or non-volatile computer storage media products. For example, the computer 1300 may include a non-removable memory interface 1310 that communicates with and controls a hard disk drive 1312, i.e., a non-removable, non-volatile magnetic medium; and a removable, non-volatile memory interface 1314 that communicates with and controls a magnetic disk drive unit 1316 (which reads from and writes to a removable, non-volatile magnetic disk 1318), an optical disk drive unit 1320 (which reads from and writes to a removable, non-volatile optical disk 1322, such as a CD ROM), a Universal Serial Bus (USB) port 1321 for use in connection with a removable memory card, etc. However, it is envisioned that other removable or non-removable, volatile or non-volatile computer storage media can be used in the exemplary computing system environment 1300, including, but is not limited to, magnetic tape cassettes, DVDs, digital video tape, solid state RAM, solid state ROM, etc. These various removable or non-removable, volatile or non-volatile magnetic media are in communication with the processing unit 1304 and other components of the computer 1300 via the system bus 1306. The drives and their associated computer storage media discussed above and illustrated in FIG. 6 provide storage of operating systems, computer-readable instructions, application programs, data structures, program modules, program data, and other instruction-based computer-readable code for the computer 1300 (whether duplicative or not of this information and data in the system memory 1308).

A user may enter commands, information, and data into the computer 1300 through certain attachable or operable input devices, such as a keyboard 1324, a mouse 1326, etc., via a user input interface 1328. Of course, a variety of such input devices may be utilized, e.g., a microphone, a trackball, a joystick, a touchpad, a touch-screen, a scanner, etc., including any arrangement that facilitates the input of data, and information to the computer 1300 from an outside source. As discussed, these and other input devices are often connected to the processing unit 1304 through the user input interface 1328 coupled to the system bus 1306, but may be connected by other interface and bus structures, such as a parallel port, game port, or a universal serial bus (USB). Still further, data and information can be presented or provided to a user in an intelligible form or format through certain output devices, such as a monitor 1330 (to visually display this information and data in electronic form), a printer 1332 (to physically display this information and data in print form), a speaker 1334 (to audibly present this information and data in audible form), etc. All of these devices are in communication with the computer 1300 through an output interface 1336 coupled to the system bus 1306. It is envisioned that any such peripheral output devices be used to provide information and data to the user.

The computer 1300 may operate in a network environment 1338 through the use of a communications device 1340, which is integral to the computer or remote therefrom. This communications device 1340 is operable by and in communication to the other components of the computer 1300 through a communications interface 1342. Using such an arrangement, the computer 1300 may connect with or otherwise communicate with one or more remote computers, such as a remote computer 1344, which may be a personal computer, a server, a router, a network personal computer, a peer device, or other common network nodes, and typically includes many or all of the components described above in connection with the computer 1300. Using appropriate communication devices 1340, e.g., a modem, a network interface or adapter, etc., the computer 1300 may operate within and in communication through a local area network (LAN) and a wide area network (WAN), but may also include other networks such as a virtual private network (VPN), an office network, an enterprise network, an Intranet, the Internet, etc. It will be appreciated that the network connections shown are exemplary and other means of establishing a communications link between the computers 1300, 1344 may be used.

As used herein, the computer 1300 includes or is operable to execute appropriate custom-designed or conventional software to perform and implement the processing steps of the method and system of the present invention, thereby, forming a specialized and particular computing system. Accordingly, the presently-invented method and system may include one or more computers 1300 or similar computing devices having a computer-readable storage medium capable of storing computer-readable program code or instructions that cause the processing unit 1302 to execute, configure, or otherwise implement the methods, processes, and transformational data manipulations discussed hereinafter in connection with the present invention. Still further, the computer 1300 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Computer 1344 represents one or more work stations appearing outside the local network which may include one or more user computers providing one or more user environments. The one or more users interact with computer 1300, which can be an exchange system of logically integrated components including a database server and web server. In addition, secure exchange of information or data can take place through the Internet using secure World Wide Web. An e-mail server can reside on system computer 1300 or a component thereof. Electronic data interchanges can be transacted through networks connecting computer 1300 and computer 1344.

While certain features of the embodiments have been illustrated as described above, many modifications, substitutions, changes, and equivalents will now occur to those skilled in the art. It is, therefore, to be understood that the appended claims are intended to cover all such modifications and changes as fall within the true spirit of the embodiments.

The invention claimed is:

1. A method of forming connected responsibilities and linking dependencies in a shared enterprise, comprising:
   a. receiving responsibility data comprising requirements data from a first node and assigning the responsibility data to a second node;
   b. receiving a first sub-responsibility data having a first sub-requirements data from the second node based at least partially on the responsibility data assigned from the first node and assigning the first sub-responsibility data having the first sub-requirements data of the second node to a third node;
   c. transmitting at least one commitment for the first sub-requirements data of the first sub-responsibility data to the second node and transmitting the first sub-responsibility data to the first node;
   d. forming a connection by receiving link data for horizontal input interdependencies and horizontal output interdependencies for the first sub-responsibility data of the second node;
   e. updating the requirements data of the responsibility data based on receiving updated requirements data of the responsibility data for the second node;
   f. receiving at least one commitment to the updated requirements data of the responsibility data for the second node; and
   g. transmitting at least one commitment of the requirements data of the responsibility data for the second node to the first node, wherein as connections are formed based on responsibilities and responsibilities updated or completed, a dynamic network among nodes is formed,
   wherein assigning the first sub-responsibility data having the first sub-requirements data of the second node to a third node further comprises:
   h. receiving a second sub-responsibility data having a second sub-requirements data from the third node based on the first sub-responsibility data assigned from the second node;
   i. receiving link data for horizontal input dependencies and horizontal output dependencies for the second sub-responsibility data of the third node;
   j. receiving requirements data based on the responsibility data for the third node;
   k. receiving at least one commitment for the first sub-requirements data of the first sub-responsibility data from the third node; and
   l. transmitting at least one commitment of the third node to the second node, and
   wherein the requirements data comprises a required output, a scheduled start date for a responsibility, and a scheduled end date for the responsibility, and
   wherein the requirements data further comprises required resources of the responsibility, responsibility value, and responsibility objective.

2. The method of forming connected responsibilities and linking dependencies in a shared enterprise of claim 1, further comprising:
   a. receiving a commitment update for the second node;
   b. identifying interdependencies of the first sub-responsibility data of the second node in response to the commitment update; and
   c. transmitting at least one notification to at least one other node that is dependent upon first sub-responsibilities data of the second node in response to the commitment update.

3. The method of forming connected responsibilities and linking dependencies in a shared enterprise of claim 1, wherein the responsibility data further comprises responsibility name, responsibility description, and a responsible individual node.

4. The method of forming connected responsibilities and linking dependencies in a shared enterprise of claim 1, wherein the sub-responsibility data comprises a task and a sub-task.

5. The method of forming connected responsibilities and linking dependencies in a shared enterprise of claim 1, wherein the at least one commitment comprises a promised start date and a promised end date for each responsibility.

6. The method of forming connected responsibilities and linking dependencies in a shared enterprise of claim 2, wherein the at least one notification is an e-mail, a status update, a scheduled meeting request, or a real time meeting request.

7. The method of forming connected responsibilities and linking dependencies in a shared enterprise of claim 6, wherein the status update is defined as active, complete, delayed, inactive, pending, planning, or start up.

8. The method of claim 6, wherein the status update causes the status indicator to fall below a predetermined threshold.

9. A network centric management and communications system for enabling users with commitments to communicate, manage, notify, assign, link, or collaborate with other users, the system comprising:
   a non-transitory computer-readable storage medium in communication with one or more processors and having instructions stored thereon which, when executed by the one or more processors, cause the one or more processors to perform operations comprising:
   a. receiving responsibility data comprising requirements data from a first node and assigning the responsibility data to a second node;
   b. receiving a first sub-responsibility data having a first sub-requirements data from the second node based at least partially on the responsibility data assigned from the first node and assigning the first sub-responsibility data having the first sub-requirements data of the second node to a third node;
   c. transmitting at least one commitment for the first sub-requirements data of the first sub-responsibility data to the second node and transmitting the first sub-responsibility data to the first node;
   d. forming a connection by receiving link data for horizontal input interdependencies and horizontal output interdependencies for the first sub-responsibility data of the second node, the interdependencies forming social connections between individual users having responsibilities and structuring communications via dependency links between interdependent users;
   e. updating the requirements data of the responsibility data based on receiving updated requirements data of the responsibility data for the second node;

f. receiving at least one commitment to the updated requirements data of the responsibility data for the second node; and
g. transmitting at least one commitment of the requirements data of the responsibility data for the second node to the first node, wherein as connections are formed based on responsibilities and responsibilities updated or completed, a dynamic network among nodes is formed; and
h. transmitting the second sub-responsibility request data to a different third node;
i. receiving the second sub-responsibility request commitment data from the third node;
j. transmitting the second sub-responsibility request commitment data to the second node;
k. receiving link data for horizontal input interdependencies and horizontal output interdependencies from the third node; and
l. transmitting the link data to the other linked node at any level in the system; and
m. providing status updates and notifications of responsibilities in real-time to affected users regarding their status so that appropriate corrective action may be taken before one or more commitments to requirements are broken, wherein one or more commitments of a responsibility are modified or updated,
wherein the requirements data comprises a required output, a scheduled start date for a responsibility, and a scheduled end date for the responsibility.

10. The network centric management and communications system of claim 9, wherein the one or more processors to perform operations comprising:
hosting at least two projects simultaneously.

11. The network centric management and communications system of claim 9, wherein the one or more processors to perform operations comprising:
removing a completed responsibility and severing the social connection between the interdependent users.

12. The network centric management and communications system of claim 9, wherein the one or more processors to perform operations comprising:
forming a dynamic social network among said interdependent users as responsibility data and commitments as interdependencies are created and removed.

13. The network centric management and communications system of claim 9, wherein the one or more processors to perform operations comprising:
providing automatic messages between users to communicate, manage, notify, assign, link, and collaborate with other individuals.

14. The network centric management and communications system of claim 9, wherein each of the individual users are categorized according to one of a responsibility assignment user, a support services user, a personnel manager user, and an executive oversight user.

15. The network centric management and communications system of claim 9, wherein the one or more processors to perform operations comprising:
providing a responsibility assignment user interface including a responsibility assignment user environment, a support services user interface including a support services environment, a personnel manager user including an interface personnel manager environment, and an executive oversight user interface including an executive oversight environment.

16. The network centric management and communications system of claim 9, wherein the one or more processors to perform operations comprising:
providing the various environments or user interfaces to users or individuals across a variety of communication networks.

17. A non-transitory computer readable medium having a program recorded thereon which when executed by a processor performs a method of forming connected responsibilities and linking dependencies in a shared enterprise, the method comprising:
a. receiving responsibility data comprising requirements data from a first node and assigning the responsibility data to a second node;
b. receiving a first sub-responsibility data having a first sub-requirements data from the second node based at least partially on the responsibility data assigned from the first node and assigning the first sub-responsibility data having the first sub-requirements data of the second node to a third node;
c. transmitting at least one commitment for the first sub-requirements data of the first sub-responsibility data to the second node and transmitting the first sub-responsibility data to the first node;
d. forming a connection by receiving link data for horizontal input interdependencies and horizontal output interdependencies for the first sub-responsibility data of the second node, the interdependencies forming social connections between individual users having responsibilities and structuring communications via dependency links between interdependent users;
e. updating the requirements data of the responsibility data based on receiving updated requirements data of the responsibility data for the second node;
f. receiving at least one commitment to the updated requirements data of the responsibility data for the second node;
g. transmitting at least one commitment of the requirements data of the responsibility data for the second node to the first node, wherein as connections are formed based on responsibilities and responsibilities updated or completed, a dynamic network among nodes is formed;
h. transmitting the second sub-responsibility request data to a different third node;
i. receiving the second sub-responsibility request commitment data from the third node;
j. transmitting the second sub-responsibility request commitment data to the second node;
k. receiving link data for horizontal input interdependencies and horizontal output interdependencies from the third node; and
l. transmitting the link data to the other linked node at any level in the system,
m. providing status updates and notifications of responsibilities in real-time to affected users regarding their status so that appropriate corrective action may be taken before one or more commitments to requirements are broken, wherein one or more commitments of a responsibility are modified or updated,
wherein the requirements data comprises a required output, a scheduled start date for a responsibility, and a scheduled end date for the responsibility.

* * * * *